*(12)* United States Patent
Edirisooriya et al.

(10) Patent No.: US 7,234,028 B2
(45) Date of Patent: Jun. 19, 2007

(54) POWER/PERFORMANCE OPTIMIZED CACHE USING MEMORY WRITE PREVENTION THROUGH WRITE SNARFING

(75) Inventors: Samantha J. Edirisooriya, Tempe, AZ (US); Sujat Jamil, Chandler, AZ (US); David E. Miner, Chandler, AZ (US); R. Frank O'Bleness, Tempe, AZ (US); Steven J. Tu, Phoenix, AZ (US)

(73) Assignee: Intel Corporation, Santa Clara, CA (US)

( * ) Notice: Subject to any disclaimer, the term of this patent is extended or adjusted under 35 U.S.C. 154(b) by 349 days.

(21) Appl. No.: 10/335,131

(22) Filed: Dec. 31, 2002

(65) Prior Publication Data

US 2004/0128451 A1 Jul. 1, 2004

(51) Int. Cl.
*G06F 12/08* (2006.01)

(52) U.S. Cl. .................. 711/143; 711/142; 711/141; 711/144; 711/145

(58) Field of Classification Search ............ None
See application file for complete search history.

(56) References Cited

U.S. PATENT DOCUMENTS 5,347,634 A * 9/1994 Herrell et al. ............ 345/539
5,784,649 A * 7/1998 Begur et al. ............ 710/52
6,412,062 B1 6/2002 Xu et al.
6,983,348 B2 1/2006 Jamil et al.
2002/0116438 A1 8/2002 Tu et al.
2003/0105796 A1 6/2003 Sandri et al.
2003/0126365 A1 7/2003 Jamil et al.
2003/0154350 A1 8/2003 Edirisooriya et al.
2003/0154352 A1 8/2003 Jamil et al.
2003/0195939 A1 10/2003 Edirisooriya et al.
2004/0015669 A1 1/2004 Edirisooriya et al.
2004/0042496 A1 3/2004 Edirisooriya et al.
2004/0064643 A1 4/2004 Jamil et al.
2004/0111563 A1 6/2004 Edirisooriya et al.
2004/0111566 A1 6/2004 Edirisooriya et al.
2004/0128450 A1 7/2004 Edirisooriya et al.

OTHER PUBLICATIONS

Handy, Jim. The Cache Memory Book. 1993, Academic Press, Inc. 1st ed. pp. 62-65, 146-172.*

* cited by examiner

*Primary Examiner*—B. James Peikari
(74) *Attorney, Agent, or Firm*—Fish & Richardson P.C.

(57) ABSTRACT

A multiprocessor system may include multiple processors and multiple caches associated with the processors. The system may employ a memory snarfing technique to reduce writes to the system (or main) memory. Cache-ownership capable agents, e.g., agents with write-back caches, may snarf the data (obtain the cache line) if the required cache line is in a valid state in the agent's cache.

25 Claims, 4 Drawing Sheets

POWER/PERFORMANCE OPTIMIZED CACHE USING MEMORY WRITE PREVENTION THROUGH WRITE SNARFING

BACKGROUND

A multiprocessor system may include two or more computer processors which may work together on a single program. Each processor may have its own cache memory which is separate from the larger system (or main) memory. A cache memory may be a portion of memory made of high-speed static random access memory (SRAM). Many programs may access the same data or instructions repeatedly. By keeping as much of this information as possible in the cache, the system may avoid accessing the slower system memory.

Cache coherency protocols may be employed to manage the caches of a multiprocessor system to prevent data from being lost or overwritten before the data is transferred from a cache to the system memory or from a cache to another cache. For example, in a system employing a snooping protocol, such as the MSI protocol, caches on the bus may monitor (or snoop) the bus to determine if they have a copy of the block of data requested on the bus. The caches may modify the state of a memory block they contain in a cache line from, e.g., modified (M) or dirty, shared (S), or invalid (I), in response to read or write operations taken by other caches on the bus.

DETAILED DESCRIPTION

Figure 1:
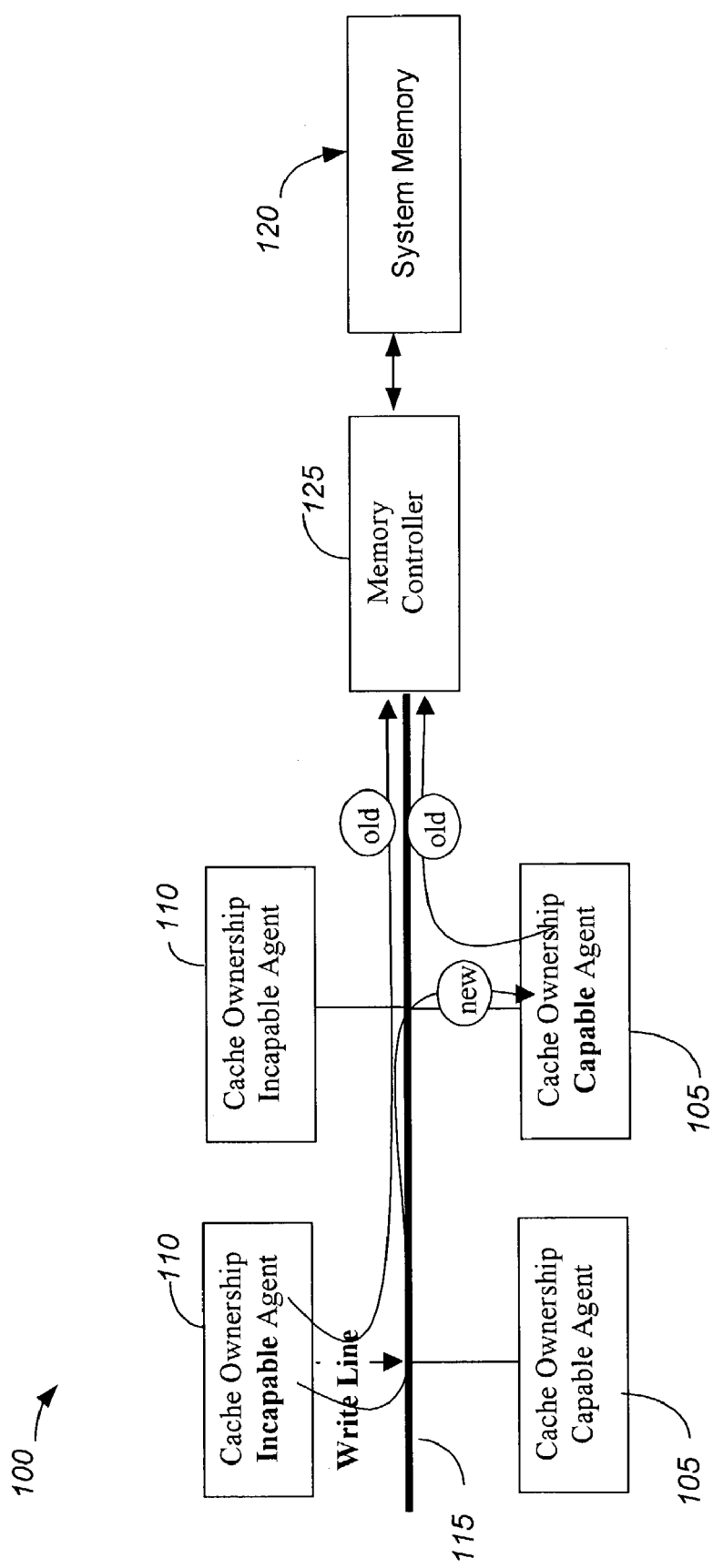
FIG. 1 is a block diagram of a multiprocessor system which may employ a cache coherency protocol.

FIG. 1 illustrates a multiprocessor system 100 according to an embodiment. A number of cache-ownership capable agents 105 and cache-ownership incapable agents 110 may share a system bus 115. The cache-ownership capable agents 105 and cache-ownership incapable agents 110 may access a system (or main) memory 120 through a memory controller 125 on the bus 115.

Figure 2:
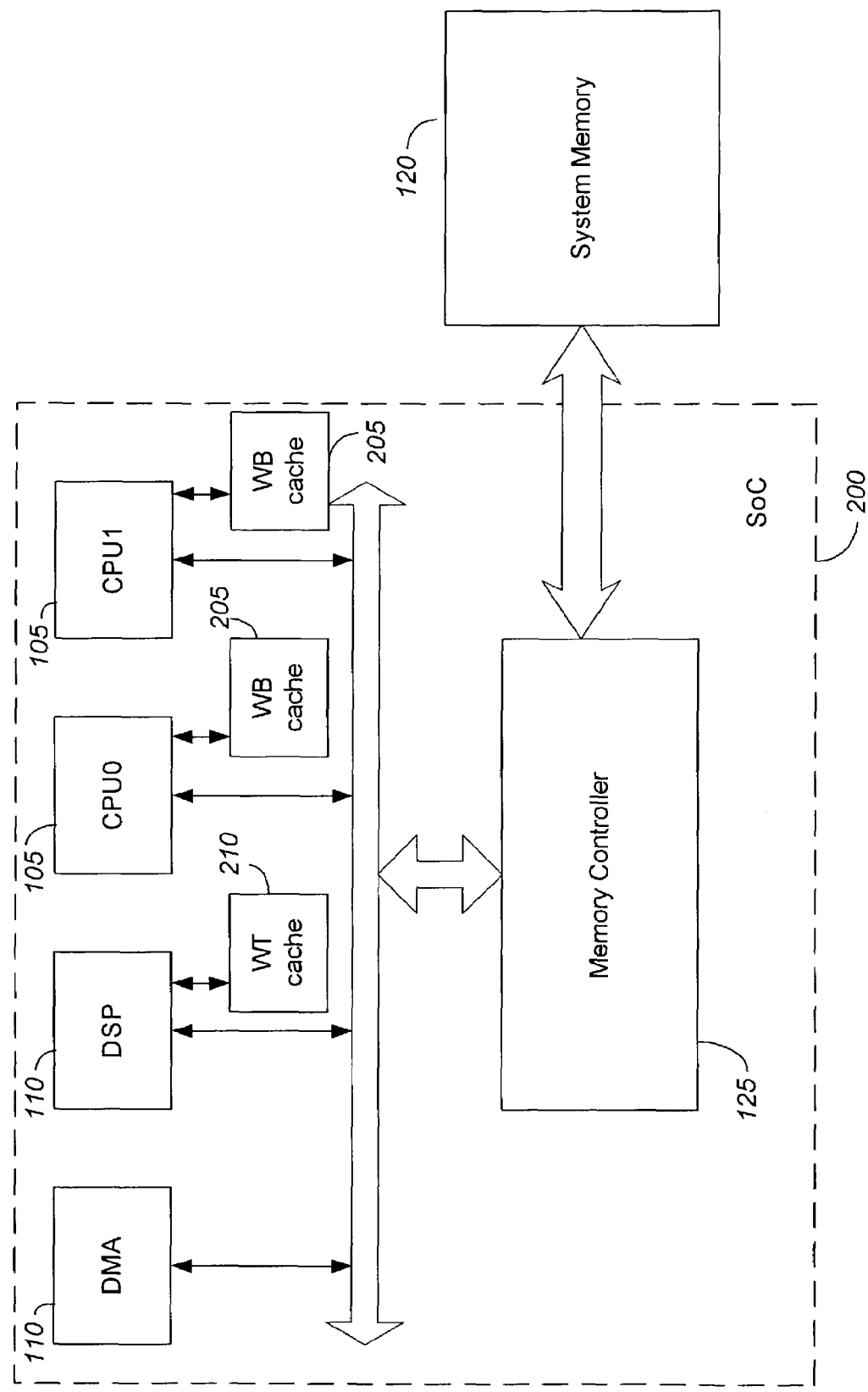
FIG. 2 is a block diagram of a system-on-chip (SoC) including multiple processors with separate caches.

The system 100 may be a system-on-chip (SoC) integrated circuit (IC) 200, as shown in FIG. 2. The SoC 200 may include different types of processors. Processors with write-back caches 205 may implement cache-ownership capable agents 110. In write-back caching, data modifications (e.g., write operations) to data stored in the write-back cache 205 may not be copied to system memory 120 until necessary. In contrast, a write-through cache 210 may perform write operations in parallel, e.g., the write-though cache 210 may write data to system memory 120 and the write-through cache 210 simultaneously. Processors which have write-through caches or which do not have caches may implement cache-ownership incapable agents. Such processors may include, for example, Digital Signal Processing (DSP) devices, Direct Memory Access (DMA) devices, and Universal Serial Bus (USE) hosts.

When a cache-ownership incapable agent 110 wants to update a line, it may write the line directly to the system memory 120. Other agents which wish to see the line may have to grab the line from the system memory 120. In an SoC system, accessing system memory 120 may require off-chip, or even off-board, operations. Such operations may be slower and require more power than memory access operations to on-chip caches. For example, an off-board memory access may require a voltage step up to transmit through a high-voltage region, e.g., from about 0.5 V on-chip voltage to about 5 V, which may result in increased power consumption. External memory access may also increase address and data traffic in the system interconnect. If such write traffic occurs very often, it may consume significant amount of power.

External memory access such as memory writes may be reduced by utilizing data already stored in caches in the system. A cache-ownership capable agent may snarf data placed on the bus due to a write by a cache-ownership incapable agent, e.g., obtain the cache line corresponding to the memory line to be written from its own cache, if the required cache line is in a valid state in the agent's cache. This eliminates the cache-ownership capable agent from fetching the data again from the memory. Another mechanism is to let the write update cache only within a system without causing any memory write. The memory write may only occur when the cache line gets flushed or cleaned from the cache by a special instruction.

The system 100 may employ a cache coherency scheme to manage the caches of a multiprocessor system to prevent data from being lost or overwritten before the data is transferred from a cache to the system memory 120. The system may employ a snooping cache coherency protocol. A snooping cache coherency protocol may include a snoop phase in which caches on the bus may monitor (or snoop) the bus to determine if they have a copy of a block of data requested on a bus, and a data phase in which the caches may modify the state of a memory block they contain in response to read or write operations taken by other caches on the bus.

Figure 3:
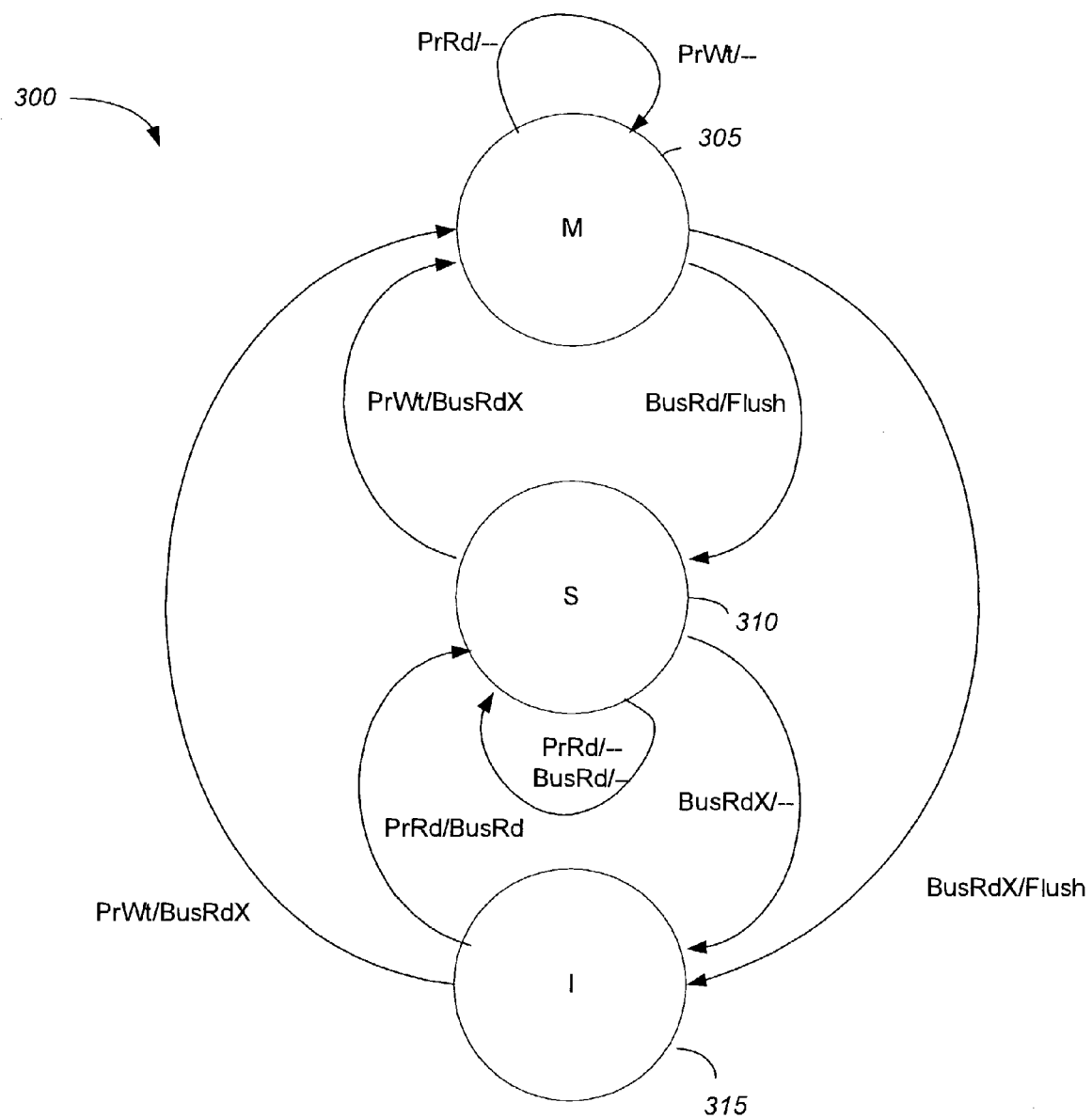
FIG. 3 is a state diagram for a snooping cache coherency protocol.

FIG. 3 is a state diagram 300 illustrating an exemplary snooping protocol, e.g., an MSI protocol, in which the state of a memory block may transition between a modified (M) or dirty state 305, a shared state (S) 310 (in which two or more caches may have copies), and an invalid state (I) 315. A transaction may occur on the bus when a processor performs a read (PrRd) or a write (PrWt) operation. The MSI cache may snoop the bus on a bus transaction. The bus transactions may include requesting a copy of the memory block with no intent to modify (BusRd), requesting a copy with intent to modify (BusRdX), and updating memory (BusWB). BusRd may be used to service a miss, and BusRdX may be used to signal other caches about an impending write. Based on these actions, the MSI cache may update the state of the memory block, perform a bus transaction, or flush the memory block onto the bus.

A MESI protocol may introduce an exclusive state (E). A MESI cache may place a cache line in the exclusive state if that cache is the only cache with a copy of the cache line. The cache may modify the exclusive cache line without a bus transaction. A MOESI protocol may introduce an owned state (O). The owned state may be triggered when the data being requested is in more than one processors' cache and the data in one of those caches has been modified.

The agents 105, 110 may communicate with each other using, for example, hit (HIT), hit/modified (HITM), and back-off (BOFF) signals. A HIT signal may be sent by an agent to indicate an address match if the line on the bus is in the exclusive (E) or shared (S) state. A logical OR operation may be performed on the HIT signals, and the OR'ed HIT may be sent back to every agent on the bus. A HITM signal may be sent by an agent to indicate an address match if the line on the bus is in a modified (M) or owned (O) state. The OR'ed HITM may also be sent to every agent on the bus. A BOFF signal may be sent to indicate that some agent which has the shared copy would like to intervene. Any other agents which have the shared copy may back off when a BOFF signal is asserted.

Figure 4:
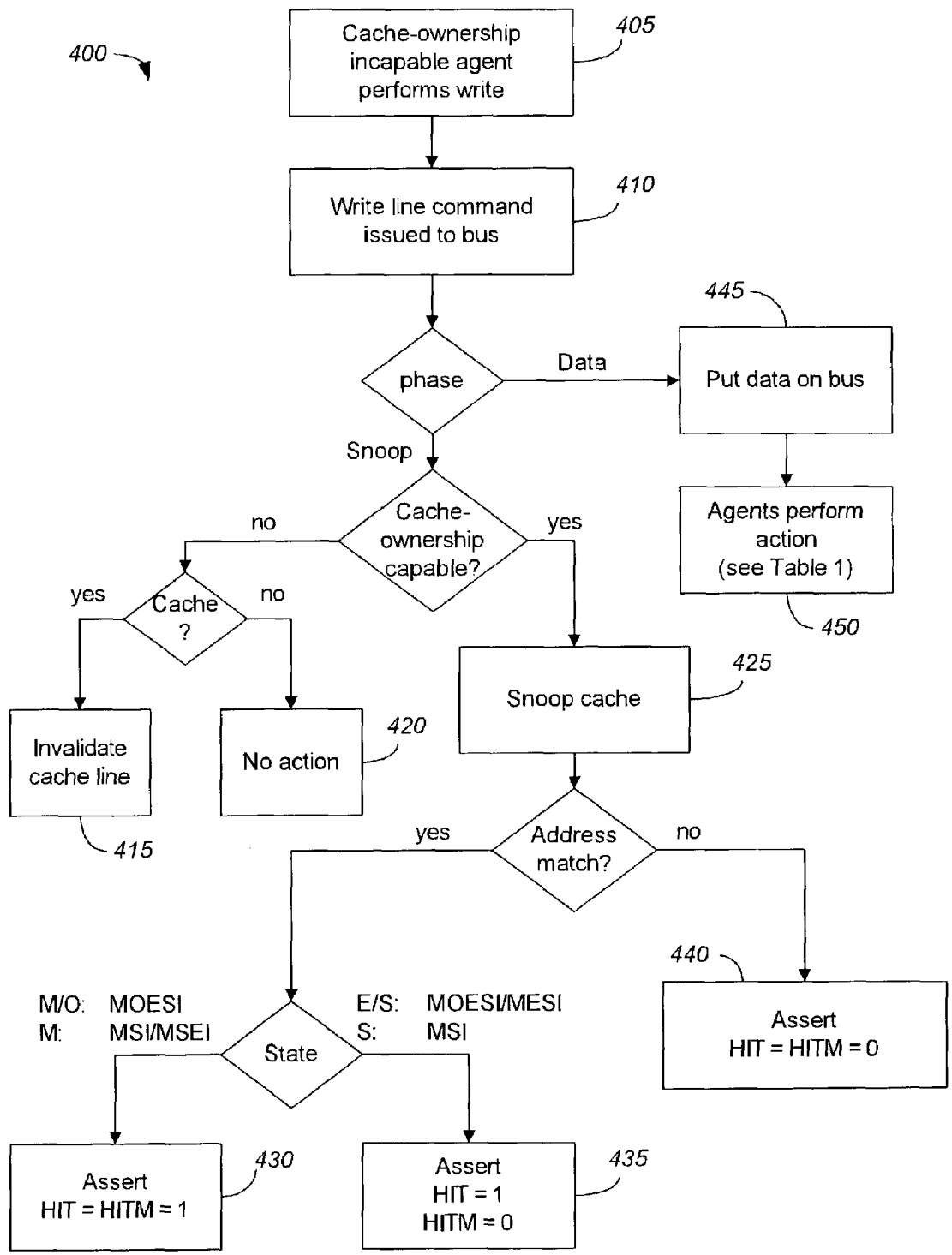
FIG. 4 is a flowchart describing a write snarfing operation.

FIG. 4 shows a flowchart describing a write snarfing operation 400. A cache-ownership incapable agent 110 may perform a write (block 405) and a write line command may be issued to the bus (block 410). During the snoop phase, if the agent is not a cache-ownership capable agent, then the agent may invalidate the cache line if it has a write-through cache 210 (block 415), or do nothing if the agent does not have a cache (block 420). If the agent is a cache-ownership capable agent 105, the agent may snoop its cache 205 (block 425). If the address matches one of its tags, the agent may assert HIT=HITM=1 if the line is in the M/O state for a MOESI cache or if the line is in the M state for a MSI/MESI cache (block 430). The agent may assert HIT=1, HITM=0 if the line is in the E/S state for a MOESI/MESI cache or if the line is in S for a MSI cache (block 435). If the address does not match one of its tags, the agent may assert HIT=HITM=0 (block 440).

During the data phase, the agent that originated the write operation may put the data on the bus (block 445). The other agents on the bus may then take an appropriate action based on the type of cache coherency protocol (block 450), as shown in Table 1.

| Coherency Protocol | Current State | BOFF | Next State | Comment |
|---|---|---|---|---|
| MSI/ MESI/ MOESI | M | N/a | M | This agent may write new data to its cache line |
| MOESI | O | N/a | M | All other shared copies may be invalidated; this agent may write new data to its cache line |
| MESI/ MOESI | E | N/a | M | This agent may write new data to its cache line |
| MSI/ MESI | S | N | M | This agent may write new data to its cache line |
| MSI/ MESI | S | Y | I | This agent may back off and invalidate the line |
| MOESI | S | N | O | This agent may write new data to its cache; all other agents may write new data to their cache but maintain their Shared states. |

-continued

| Coherency Protocol | Current State | BOFF | Next State | Comment |
|---|---|---|---|---|
| MOESI | S | Y | S | This agent may write new data to its cache. |
| | I | N/a | I | Stay invalid; the write goes to memory |

The memory snarfing operation 400 may prevent external memory transactions when a cache-ownership incapable agent performs a write operation on the bus and there is a valid copy in a Modified, Owned, Exclusive, or Shared state in any cache-ownership capable agent's cache. Preventing writes from going to system memory while there is a cached copy may reduce power consumption. The memory snarfing operation 400 may also lower the address/data traffic in the system interconnect and reduce the write latency by optimizing loads after a store operation, thereby improving the overall system performance.

The snarfing operation may be used with other cache coherency protocol support cache snooping.

A number of embodiments have been described. Nevertheless, it will be understood that various modifications may be made without departing from the spirit and scope of the invention. For example, blocks in the flowchart may be skipped or performed out of order and still product desirable results. Accordingly, other embodiments are within the scope of the following claims.

The invention claimed is:

1. A method comprising:
    issuing a write command, of a cache-ownership incapable agent, to a system bus;
    placing data from the cache-ownership incapable agent on the system bus; and
    updating a cache line in a write-back cache with the data, in place of the data being written to a system memory in accordance with said placing the data on the system bus, wherein the write-back cache is associated with a cache-ownership capable agent; and
    said updating comprises:
        determining whether a cache line identifier associated with the data on the system bus matches a cache line identifier in the write-back cache, and
        determining a cache coherency state of the cache line in the write-back cache.

2. The method of claim 1, wherein said placing comprises:
    placing data from a cache line in a write-through cache on the system bus.

3. The method of claim 1, wherein said placing comprises:
    said issuing the write command to the system bus.

4. The method of claim 1, wherein said updating comprises:
    writing the data to the cache line in the write-back cache in response to the cache line having one of a modified state, an owned state, an exclusive state, and shared state.

5. The method of claim 4, further comprising:
    identifying a second cache line in a second write-back cache corresponding to the cache line; and
    invalidating the second cache line in response to the cache line in the write-back cache having an owned state.

6. The method of claim 5, further comprising:
changing the state of the cache line in the write-back cache from the owned state to a modified state.

7. The method of claim 1, further comprising:
asserting a first message on the system bus in response to the cache line having a valid state.

8. The method of claim 1, further comprising:
asserting a first message on the system bus in response to the cache line having one of a modified state, an owned state, an exclusive state, and a shared state.

9. The method of claim 1, further comprising:
identifying a second cache line in a write-through cache; and
invalidating data in the second cache line.

10. Apparatus comprising:
a system bus;
a cache-ownership incapable agent operative to place data on the system bus; and
a cache-ownership capable agent including a write-back cache, the cache-ownership capable agent being operative to update a cache line in a write-back cache with the data, in place of the data being written to a system memory in accordance with the data being placed on the system bus by the cache-ownership incapable agent.

11. The apparatus of claim 10, wherein the data is associated with a cache line identifier.

12. The apparatus of claim 11, wherein the cache-ownership capable agent is operative to assert a message on the system bus in response to determining that the cache line identifier associated with the data matches an identifier associated with a cache line in the write-back cache having a valid state.

13. The apparatus of claim 12, wherein the valid state comprises one of a modified state, an owned state, an exclusive state, and a shared state.

14. The apparatus of claim 10, wherein the write-back cache is operative to perform a snooping operation when data is placed on the system bus.

15. The apparatus of claim 10, wherein the write-back cache comprises an MSI cache.

16. The apparatus of claim 10, wherein the write-back cache comprises an MESI cache.

17. The apparatus of claim 10, wherein the write-back cache comprises an MOESI cache.

18. The apparatus of claim 10, further comprising:
a second cache-ownership incapable agent, said second cache-ownership incapable agent including a write-through cache.

19. The apparatus of claim 18, wherein the second cache-ownership incapable agent is operative to identify a second cache line in the write-through cache corresponding to the cache line in the write-back cache and invalidate data in the second cache line.

20. The apparatus of claim 10, further comprising:
a second cache-ownership capable agent including a second write-back cache.

21. The apparatus of claim 20, wherein the second cache-ownership capable agent is operative to identify a second cache line in the second write-back cache corresponding to the cache line and invalidate the second cache line in response to the cache line having an owned state.

22. A multiprocessor system comprising:
a system bus;
a system memory;
a first processor including a cache-ownership incapable agent operative to place data on the system bus; and
a second processor including a cache-ownership capable agent and a write-back cache, the cache-ownership capable agent being operative to update a cache line in a write-back cache with the data, in place of the data being written to the system memory in accordance with the data being placed on the system bus by the cache-ownership incapable agent.

23. The multiprocessor system of claim 22, further comprising:
a system-on-chip including
the first processor,
the second processor,
the system bus, and
a memory controller operative to control memory access between the system bus and the system memory.

24. An article comprising a machine-readable medium including machine-executable instructions, the instructions operative to cause a machine to:
issue a write command, of a cache-ownership incapable agent, to a system bus;
place data from the cache-ownership incapable agent on the system bus; and
update a cache line in a write-back cache with the data, in place of the data being written to a system memory in accordance with placement of the data on the system bus, wherein the write-back cache is associated with a cache-ownership capable agent; and
the instructions operative to cause the machine to update includes instructions operative to cause the machine to:
determine whether a cache line identifier associated with the data on the system bus matches a cache line identifier in the write-back cache, and
determine a cache coherency state of the cache line in the write-back cache.

25. The article of claim 24, wherein the instructions operative to cause the machine to update includes instructions operative to cause the machine to place data from a cache line in a write-through cache on the system bus.

* * * * *